Nov. 24, 1942. J. LE CLAIR 2,302,780
WINDSHIELD WIPER
Filed Sept. 5, 1941
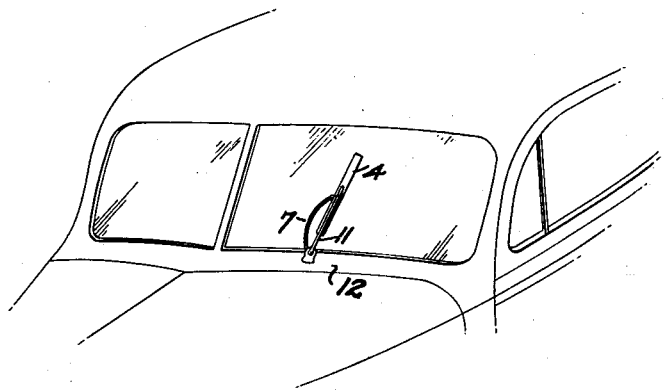
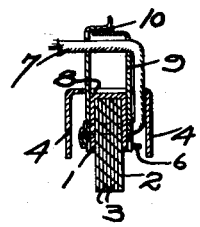
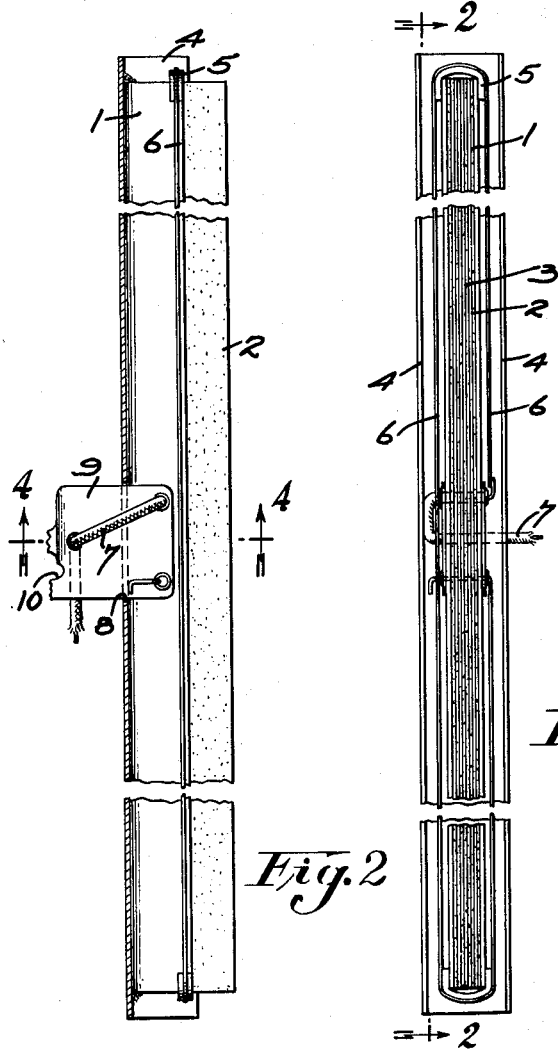
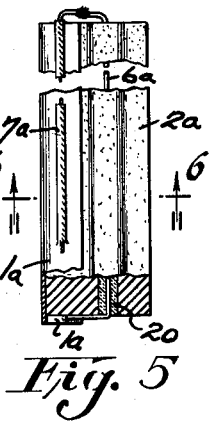
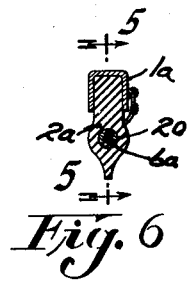
INVENTOR
Jules Le Clair
BY
Gerald J. Baldwin
ATTORNEY

UNITED STATES PATENT OFFICE 2,302,780

WINDSHIELD WIPER

Jules Le Clair, Ferndale, Mich., assignor of one-half to Idella S. Nicholls, Detroit, Mich.

Application September 5, 1941, Serial No. 409,665

2 Claims. (Cl. 15—250.5)

This invention relates to improvements in windshield wipers. When it is snowing, particularly at temperatures around and slightly below freezing, the blades of conventional wipers often freeze and become rigid, and also masses of snow and slush frequently adhere to them, with the result that their efficiency becomes materially impaired.

It is an object of this invention to provide a windshield wiper with means for heating the blade sufficiently to prevent it becoming rigid, and also to prevent the adhesion of snow and slush thereto.

Another object of the invention is to provide a windshield wiper which may be readily mounted on a conventional operating arm and which includes a heating element having a lead-in wire which may be readily connected to the electrical system already installed in the vehicle to which it is to be applied.

Having thus briefly and broadly stated some of the objects and advantages of the invention I will now proceed to describe two preferred embodiments thereof with the aid of the accompanying drawing, in which:

Figure 1 is a perspective view showing my windshield wiper mounted in position on a vehicle.

Figure 2 is an enlarged sectional view taken on the line 2—2 of Figure 3.

Figure 3 is an enlarged front view, and

Figure 4 is a section on the line 4—4 of Figure 2.

Figure 5 is a sectional view on the line 5—5 of Figure 6 showing a modified construction, and Figure 6 is a section on the line 6—6 of Figure 5.

Referring to the drawing, and particularly to Figures 1 to 4, I designates a U-shaped holder between the opposite sides of which a blade 2 is suitably held so that its operating extremity projects forwardly therefrom. In this instance the blade 2 consists of a plurality of thin flat pieces 3 of rubber or other flexible material lying one against the other. The U-shaped holder I is welded or otherwise suitably secured throughout its length within a similarly shaped reflector 4 the sides of which are outwardly spaced from the holder and preferably extend slightly beyond the latter toward the operating edge of the blade. Provided around the ends of the holder I are insulators 5, and extending substantially around the holder, and supported by these insulators, is a heating element 6, one extremity of which is grounded to the wiper, in the present instance by directly connecting it to the holder I, and its opposite extremity is connected to an insulated lead-in wire 7.

Substantially centrally of its length the reflector 4 is apertured at 8 for the passage of a supporting member 9 therethrough which is secured to the holder I. This member is also provided with any preferred means of attachment, as indicated at 10, to a conventional operating arm 11, Figure 1. In the present instance the insulated lead-in wire 7 is shown extending through the supporting member 9 and extends from the latter into the vehicle body 12 for connection to the electrical system within the said body.

In the modification shown in Figures 5 and 6, the blade 2a consists of a single flexible element projecting outwardly from a U-shaped holder 1a in which it is mounted. Formed longitudinally through the blade 2a toward its operating edge is an aperture 20 through which a heating element 6a extends. This element is preferably packed in suitable cement or other material to form a good heat conductor between the said element and the blade to be heated. In this instance one extremity of the element 6a is grounded through the holder 1a and a lead-in wire 7a is connected to its opposite extremity.

From the foregoing it will be clearly seen that sufficient heat is imparted to the blade, and particularly to its operating edge, to prevent its freezing and to prevent the adhesion of snow and the like thereto, so that the said blade will remain flexible even when made up of a plurality of thin pieces of material as shown at 3 in Figures 2 and 3.

While the preferred constructions of the invention have been described and shown, it is understood that alterations and modifications may be made thereto provided the said alterations and modifications fall within the scope of the appended claims.

What I claim is:

1. A windshield wiper comprising a U-shaped holder, a flexible blade supported between opposite sides of the holder and projecting forwardly from the open end of the latter to provide an operating surface to contact a windshield, a substantially U-shaped reflector secured to the closed central portion of the holder and having its sides outwardly spaced from the sides of said holder, and an electric heating element extending along both sides and around the ends of the holder adjacent the extremity of the latter from which the blade projects, said element being carried by the holder and insulated therefrom and positioned between said holder and the adjacent sides of the reflector whereby heat from the element is directed against the blade sides adjacent the windshield contacting surface of the blade.

2. A windshield wiper comprising a U-shaped holder, a flexible blade supported between opposite sides thereof and projecting therefrom so that its exposed extremity forms an operating surface to contact a windshield, a substantially U-shaped reflector the folded central portion of which is mounted upon the folded and closed end of the holder, the sides of the reflector being outwardly spaced from the sides of the holder, and electric element extending along both sides of the holder and spaced between the latter and the adjacent sides of the reflector whereby heat is directed from the element against both sides of the blade adjacent its contacting surface by said reflector.

JULES LE CLAIR.